July 19, 1938.  F. G. PAULLY  2,124,208
METHOD AND APPARATUS FOR AMPLIFYING AND RECORDING ELECTRICAL CURRENTS
Filed Feb. 15, 1934
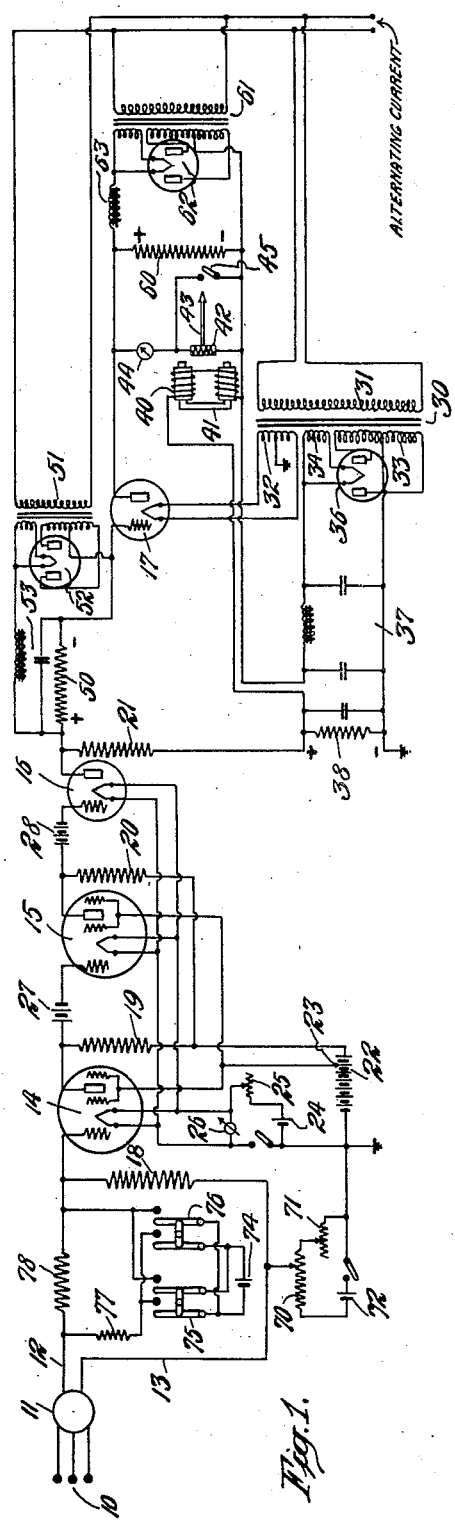
INVENTOR
FRANK G. PAULLY
BY
ATTORNEY Patented July 19, 1938

2,124,208

UNITED STATES PATENT OFFICE 2,124,208

METHOD AND APPARATUS FOR AMPLIFYING AND RECORDING ELECTRICAL CURRENTS

Frank G. Pauly, Newark, N. J., assignor to Hellige, Inc., New York, N. Y., a corporation of New York Application February 15, 1934, Serial No. 711,361

5 Claims. (Cl. 128—2.06)

This invention relates to amplifying electrical currents and has for its principal object to amplify and record or otherwise translate such currents without phase displacement or other distortion.

An important application of the invention is in amplifying and recording feeble electrical currents produced by living organisms, as in making electrocardiograms of currents produced by the heart, or in recording other body pulsations, where proper diagnosis depends upon maintaining the original wave form.

To this end, another object of the invention is to provide an improved method and means for producing a direct record of heart beats or other body pulsations, which may be examined and accurately interpreted during as well as immediately after recording, and is entirely free from distortion components such as are commonly caused by parasitic body potentials or by fluctuations in the recording system itself.

Other objects of the invention are to simplify the construction and operation of recording systems of the above type; to eliminate distortion and increase the stability of the system as a whole; to eliminate all possibility of danger to the patient; to compensate for variable potential characteristics due to skin currents, etc. produced by the living body; to synchronously record the variations in potential produced by the heart, pulse or other muscular activity for accurate and instant visual interpretation; and to enable the performance of the system to be tested and checked and the accuracy of each tracing determined while it is being made without interrupting or prolonging the recording operation or discommoding the patient.

Medical science has long recognized the value of the electrocardiographic method of diagnosing heart ailments and several different types of apparatus have been proposed for this purpose since Einthoven demonstrated his first string galvanometer electrocardiograph thirty years ago. Some of these machines operate on the old string principle, with certain refinements for greater ease of operation, while others, developed more recently, employ amplifying tubes similar to those used in radio receiving sets.

The string galvonometer fell into disfavor because of its delicate construction and the difficulty of adjusting the mechanism and keeping it in proper working order. As a result, string type machines were largely superseded by photographic recorders employing vacuum tubes for amplifying the feeble heart currents, an oscillograph operated by the amplified currents, and a system of mirrors for reflecting a beam of light into a recording camera in accordance with the movements of the oscillograph armature. Some of these machines are reasonably efficient but they all have one great drawback: the camera has to be loaded in a dark-room and the film must, of course, be developed before the cardiogram can be examined, and until this is done the operator does not even know whether or not the record has been successfully taken.

This inherent disadvantage of photographic recording has resulted in various attempts to produce electrocardiograms by direct recording with pen and ink but these attempts have been unsuccessful or only partially successful for several reasons. In the first place, ink recorders require much more power than a photographic recorder and the various resistance-capacity coupled amplifiers and rectifiers, vibrating tickers, etc., employed in such power systems introduce distortion components which render the tracing unreliable. They furthermore introduce a time constant causing shifts in phase which affect the accuracy of the tracing, and, while the error due to such phase shift might be minimized by increasing the time constant, as by employing larger condensers, this would make it necessary to wait a longer period of time for the condensers to stabilize between the taking of each load.

Again, the characteristics of vacuum tubes may change, producing non-linearity and consequent distortion in the tracing which cannot easily be detected in ordinary recording systems. All these disadvantages are encountered to some extent in photographic recorders but they are accentuated by the power amplifiers and associated mechanisms which are peculiar to direct recording systems. Another difficulty encountered in direct recording systems is that the increased current usually causes deleterious heating of the recording element which may burn out unless special care is exercised.

My invention provides an improved direct recording system which overcomes all the foregoing difficulties and embodies many new features and advantages which increase the usefulness of such apparatus in the hospital, clinic, or medical college, or in the office of the private medical consultant. In its preferred form it comprises means for amplifying the feeble heart, pulse or other body potentials without distortion; a direct coupled power amplifier which steps up the amplified voltages without introducing an objectionable time constant; an electrically operated pen or stylus for making a direct tracing on a moving tape; means for compensating for parasitic body potentials due to skin currents, etc. which may vary in different patients and which distort the tracing when superimposed upon the main wave; means for maintaining a definite time relationship between different waves as well as different portions of the same wave to insure correct interpretation of each tracing; and means for checking the sensitivity of the system and the accuracy of each tracing while it is being recorded; the complete system being extremely simple in construction and operation and capable of being transported in one or two portable carrying cases.

Because of the foregoing and other advantages in the field of electrocardiography I have chosen to illustrate my invention in its application to such a system but it will be evident, as the description proceeds, that many features of the invention are equally useful in other fields. With this in mind, the invention will be described in connection with the accompanying drawing, in which:

Fig. 1 is a diagrammatic view of an electrocardiograph recording system embodying the invention;

Fig. 2 is a plan view of the recording mechanism and tape;

Fig. 3 is a side view of the recording mechanism showing the tape feed; and

Fig. 4 is a plan view of the tape showing a typical tracing.

The recording system of Fig. 1 is adapted to be used with a plurality of patient electrodes (not shown) which may be applied to different parts of the body in the usual manner. The electrodes, for example, may be three in number and may be connected to the two arms and one leg of the patient. The electrodes are connected to posts 10 of switch 11 which may be of any suitable type, such as a two pole, four point switch, whereby any two of the posts 10 may be connected to leads 12 and 13 in the input of an amplifier system comprising a plurality of space discharge amplifiers connected in cascade. The embodiment shown comprises a four stage amplifier including space discharge devices or tubes 14 to 17, the first two stages comprising screen grid tubes and the final stage comprising a power tube. It is to be understood, however, that this particular embodiment is shown merely for purposes of illustration.

Leads 12 and 13 are connected across a resistance 18 which is in the input circuit of tube 14 and provides a resistance coupling between the amplifier and posts 10 leading to the patient electrodes. A pure resistance coupling is obtained for the other stages by means of resistances 19, 20, and 21 which are connected respectively to the anodes of tubes 14, 15, and 16 and are also included in the input circuits of tubes 15, 16, and 17 respectively.

Resistances 19 and 20 may be connected to a suitable source of anode potential such as a battery 22. The screen grids of tubes 14 and 15 may be connected to a tap 23 on battery 22. The cathodes of tubes 14, 15, and 16 may be energized by a battery 24 having a rheostat 25 and a voltmeter 26. The control elements or grids of tubes 15 and 16 are maintained at a proper potential by biasing batteries 27 and 28 respectively which oppose the potential of battery 22 and prevent the comparatively high anode potential from being applied to the grids of the successive tubes.

It is to be noted that the foregoing arrangement eliminates all blocking condensers from the coupling circuits, this being an important advantage since condensers would introduce time or phase displacements or other wave distortion into the system.

For supplying the anode potential of tubes 16 and 17 and the cathode current for tube 17 a power supply unit may be provided comprising a power transformer 30 having its primary winding 31 connected to a source of alternating current and having three secondary windings 32, 33, and 34. The secondary winding 32 may be connected to the cathode of tube 17 for energizing same. Secondary winding 33 may be connected to the anodes of a full wave rectifier 36 the cathode of which is supplied with heating current by secondary 34. Rectifier 36 is connected through a suitable filter network 37, which eliminates the alternating current components, to a resistance 38. This resistance 38 is connected through resistance 21 to the anode of tube 16 whereby the potential drop across said resistance 38 provides the anode potential for said tube.

The indicator or recording instrument 41 is of any suitable type having field coils 40 and a moving coil 42 carrying a recording stylus 43. Field coils 40 are connected in series with the positive lead from filter network 37 to resistance 38 so as to energize said field coils. The anode of tube 17 is connected through the moving coil 42 of the instrument to the positive lead of filter network 37. A zero center milliameter 44 may also be connected in series with said moving coil 42 to facilitate adjustment of the instrument, said coil 42 being short circuited by a switch 45 during adjustment. It is to be noted that substantially the full potential of rectifier 36 is applied to the anode of tube 17 but that the potential applied to the anode of tube 16 by said rectifier is reduced by the potential drop in coils 40 which are in series therewith.

For obtaining the proper grid bias on tube 17 and compensating for the anode potential supplied through resistance 21 a grid resistance 50 may be inserted in the grid lead of tube 17. A current is caused to pass through this resistance 50 in a direction to apply a negative potential to said grid by a rectifier system including a power transformer 51 energized by a source of alternating current and supplying a full wave rectifier 52 which is connected, through filter network 53, across said resistance 50. This rectifier system is similar to the power supply unit described above. It is to be understood, however, that its function is merely to produce a potential drop across resistance 50 and that a battery could be used for this purpose in a manner similar to batteries 27 and 28 if desired.

If the space current of tube 17 is allowed to pass through the moving coil 42 of the instrument, the coil would tend to heat up and might even burn out. To prevent this, a potential is applied to said coil opposing the potential drop of said space current therein. This prevents passage of the constant component of the space current through said coil but does not interfere with the actuation thereof in response to the signal component of the space current. Such a potential may be applied by the potential drop in a resistance 60 which is connected across coil 42. Current is caused to pass through resistance 60 by a rectifier system including a transformer 61, rectifier 62 and filter 63 similar to that described above in connection with grid resistance 50. It is to be understood, however, that this rectifier system may be replaced by a battery if desired.

In using a system of the type described it is found that currents produced by the skin of the patient affect the result; also that said skin currents vary in different patients. These currents, however, are substantially constant or unidirectional and may be compensated for by varying the grid bias of tube 14. For this purpose a potentiometer 70, fine control rheostat 71 and battery 72 are included in the grid return of tube 41. The potential drop across the portion of potentiometer 70 in use determines the grid potential of the tube and the operating level of the system and may be varied to cause stylus 43 to occupy a median position corresponding to zero current and to bring the graph or tracing in the center of tape 73 to be described.

For standardizing and checking the operation of the system a standardizing device is provided comprising a standard battery 74, for example a dry cell producing 1.5 volts. This battery is connected through a pole changing device, comprising a pair of oppositely connected push button or other switches 75 and 76, to a resistance 77 of for example 1500 ohms which is connected in series with a resistance 78 of for example one ohm in the grid lead of the first tube 14. The foregoing constants are such that a current of one milliampere passes through resistance 78 in one direction or the other according to whether switch 75 or switch 76 is actuated. This produces a potential drop of exactly one millivolt in resistance 78 which will cause a predetermined fluctuation or shift of stylus 43 transversely on tape 73.

Tape 73 may be served from a reel 81 and passed over a platform 82 to register with stylus 43. The tape is preferably driven by a sprocket 83 adapted to engage perforations 84 in the margins of the tape. The sprocket 83 may be driven by any constant speed mechanism such as a phonograph motor or synchronous motor 85 through bevel gears 86 as shown in Fig. 3. A definite speed is essential to a proper interpretation of the tape readings as will be pointed out below.

In using the above described system for recording the heart beats of a patient the electrodes are applied to the body at spaced points, for example to the two arms and one leg. The switch 11 is thrown so as to connect a selected pair of patient electrodes across the input of the amplifier system. The currents produced by the body and modified in accordance with the heart beats pass through resistance 18 and produce a potential drop therein which is used to actuate the amplifier system. The energy is thus amplified sufficiently to actuate the moving coil 42 of the recording device 41. The response of stylus 43 of the recording device corresponds exactly with the pulsations in input current produced by the heart beats because the pure resistance coupling of the different stages of amplification eliminates all condensers and inductances which would introduce a time lag or phase shift or would produce parasitic oscillations or otherwise distort the output.

In the embodiment shown in the drawing stylus 43 is of the fountain pen type, being supplied with ink in any suitable manner and making an ink tracing directly on tape 73, although the stylus may be arranged to trace a graph on chemically treated paper if desired. In any case, for the proper interpretation of the electrocardiogram a definite time relationship must be established. This is necessary in order that the time interval between two waves or the duration of one wave may be accurately determined. Diagnostically this time relationship is very important since it may be the only indication of an abnormality. The preferred speed of tape 73 for electrocardiographic purposes is 25 millimeters per second. I insure this exact speed by employing the constant speed motor 85 which may be a mechanical type or may be a synchronous motor actuated from the alternating current house mains. The sprocket wheel and perforated tape are used to prevent slippage. If a faster or slower speed is desired, this is easily accomplished by changing the ratio of gears 86. If this arrangement were not used it would be necessary to employ a separate time-marking unit. Since I have a constant speed positive drive I may and preferably do print coordinate lines on tape 73 forming squares with one millimeter spacings between all lines as shown in Figs. 2 and 4. The speed of the tape being 25 millimeters per second, and the ruled spaces on the tape being one millimeter wide, each space represents .04 second which definite time relationship enables the time and shape of the pulsations to be accurately determined.

A standard sensitivity is also required for the proper interpretation of the electrocardiogram. In the embodiment disclosed, this standard is a deflection of one centimeter for one millivolt. That is, when either switch 75 or 76 is actuated the stylus 43 should deflect one centimeter in one direction or the other according to which of the switches is operated. Since the lines printed on tape 73 are one millimeter apart, if a certain wave is three millimeters high it is at once evident that the voltage of said wave is .3 millivolt. This standardizing of a tracing also has another important function as it definitely shows the performance of the instrument by indicating whether the instrument is critically, over, or under-damped. Different wave forms from the same patient might be obtained with different damping. Still another function of this standardization is the production of both a positive and a negative variation by use of the pole changing switches 75 and 76 so that linearity of the amplifier and the recording instrument is assured. Upon successively closing switches 75 and 76 the stylus 43 will shift, first in one direction and then in the other, producing offset lines 87 and 88 which should be equally spaced from the median line 89 if the system is operating without distortion. If the deflection is 10 millimeters in the positive direction, for example, but only 8 millimeters in the negative direction, the system must be checked for this deficiency and perhaps a new tube installed or other correction made. When both deflections are 10 millimeters the circuit is linear.

If any additional currents are present, as for example skin currents, which may vary in different individuals, they may be compensated for by suitable adjustment of potentiometer 70 and rheostat 71 so as to change the grid bias of tube 14 and shift the tracing on tape 73 to the center thereof. This adjustment is easily made since the tape and stylus are in full view of the operator at all times. The tape reading can thus be standardized for all individuals so as to permit accurate readings and comparisons.

The device may be built in a convenient portable unit which may be readily carried about and set up as required. Furthermore the direct tracing on the tape permits observation while the test is being made and eliminates further operations such as are involved in removing and developing a photographic film. The tape may also be projected on a screen while the record is being made for instruction purposes in a medical school or clinic to show variations in human or animal heart beats under the influence of various stimuli, depressants, etc.

After making a tracing corresponding to the potential developed by two patient electrodes, switch 11 is operated to connect differently paired electrodes to the input circuit of the amplifier. This may be repeated to obtain three leads corresponding to the three possible pairs of electrodes. Obviously more or fewer electrodes may be employed as desired. Three electrodes and three independent leads, however, have been found suitable for most purposes and enable the proper comparisons to be made.

Although the anode potentials of the various tubes could be obtained from rectifier systems I prefer to use batteries for the first two tubes, so as to eliminate all possibility of accidental shock to the patient by a short circuit between, for example, the grid and anode of these tubes.

It will be evident that the invention is capable of numerous modifications and adaptations not specifically described but embraced within the scope of the appended claims.

The invention claimed is:

1. In an electrocardiograph and in combination, a multi-stage amplifier having a plurality of space discharge tubes connected in cascade, a pure resistance coupling between successive stages adapted to translate energy without time or phase change, said coupling comprising a resistance in the anode circuit of each tube and a source of grid biasing potential connected between each resistance and the grid of the following tube to oppose the potential at said anode and prevent same from being applied to said grid, a recording device having a moving coil connected in the anode circuit of the last tube and a source of potential connected across said coil to oppose the flow of the constant component of the space current therethrough whereby said coil is prevented from overheating when in use, and means for supplying a current the characteristics of which are to be measured to the input of said amplifier.

2. In an electrocardiograph having means for deriving current from a living organism, and a multi-stage amplifier connected to amplify said current, a recording device having a stylus driven by a moving coil connected in the anode circuit of the last tube of said amplifier and a source of potential connected across the said coil to oppose the flow of the constant component of the space current therethrough whereby said coil is prevented from overheating when in use thereby avoiding distortion.

3. In an electrocardiograph having means for deriving current from a living organism and a recorder for making an electrocardiographic record thereof, a multi-stage amplifier connected to amplify the current received from said living organism and to supply the same to said recorder, said amplifier having a plurality of space discharge tubes connected in cascade and a pure resistance coupling between successive stages whereby energy is translated in said amplifier without time or phase change, a rectifying means for supplying anode potential to at least one of said tubes and a battery connected to supply anode potential to at least the first tube whereby possibility of a short circuit between the power line and the input circuit is eliminated.

4. In an electrocardiograph having means for deriving current from a living organism and a recorder for making an electrocardiographic record thereof, a multi-stage amplifier connected to amplify the current derived from said living organism and to supply the same to said recorder, a standard resistance in the input circuit of said amplifier and means for passing a standard current therethrough, and means for reversing the direction of said standard current for the recording and checking of both the positive and negative response of said amplifier.

5. In an electrocardiograph having means for deriving current from a living organism and a recorder provided with a stylus adapted to record said current on a moving tape, a power amplifier actuated by current derived from said living organism for actuating said stylus, said power amplifier having a pure resistance coupling means for translating the received energy without time or phase change, power for at least the first stage of said amplifier being supplied by a battery whereby danger of accidental short-circuit between the power line and the input circuit of the amplifier is eliminated.

FRANK G. PAULLY.